US011869341B2

(12) United States Patent
Lawrence et al.

(10) Patent No.: US 11,869,341 B2
(45) Date of Patent: Jan. 9, 2024

(54) IOT COMPATIBLE ELECTRONIC DOOR CHIME

(71) Applicant: Nicor, Inc., Albuquerque, NM (US)

(72) Inventors: Rocklan E. Lawrence, Albuquerque, NM (US); Qiang Hong, Jiangmen (CN)

(73) Assignee: NICOR, INC., Albuquerque, NM (US)

( * ) Notice: Subject to any disclaimer, the term of this patent is extended or adjusted under 35 U.S.C. 154(b) by 589 days.

(21) Appl. No.: 16/896,155

(22) Filed: Jun. 8, 2020

(65) Prior Publication Data

US 2020/0302757 A1 Sep. 24, 2020

Related U.S. Application Data

(63) Continuation-in-part of application No. 16/354,763, filed on Mar. 15, 2019, now Pat. No. 10,720,028.

(51) Int. Cl.
*G08B 3/10* (2006.01)
*H02J 3/00* (2006.01)
*H04L 67/12* (2022.01)

(52) U.S. Cl.
CPC ............ *G08B 3/10* (2013.01); *H02J 3/00* (2013.01); *H04L 67/12* (2013.01)

(58) Field of Classification Search
CPC ..... G08B 3/10; H02J 3/00; H02J 7/025; H02J 5/005; H02J 50/12; H04L 67/12; H04N 7/186
See application file for complete search history.

(56) References Cited

U.S. PATENT DOCUMENTS

| | | | | |
|---|---|---|---|---|
| 10,609,344 B1* | 3/2020 | Tso | ........................ | H04N 7/186 |
| 10,938,294 B1* | 3/2021 | Chin | ..................... | H04N 23/651 |
| 11,412,189 B1* | 8/2022 | Skeoch | ................... | H04N 7/186 |
| 2002/0149492 A1* | 10/2002 | Buckingham | ............ | G08B 3/10 340/815.4 |
| 2015/0373796 A1* | 12/2015 | Bahrehmand | ........ | H05B 45/325 315/129 |
| 2017/0339262 A1* | 11/2017 | Scalisi | ................ | H04M 1/0291 |
| 2018/0191930 A1* | 7/2018 | Jeong | ..................... | H04N 7/186 |
| 2018/0279429 A1* | 9/2018 | Sadwick | ............ | H05B 45/3725 |
| 2019/0149775 A1* | 5/2019 | Alamgir | ............. | G08B 13/1966 348/143 |

FOREIGN PATENT DOCUMENTS

| | | |
|---|---|---|
| CN | 303998536 S | 1/2017 |
| CN | 304004053 S | 1/2017 |
| CN | 304044124 S | 2/2017 |
| CN | 206657450 U | 11/2017 |

* cited by examiner

*Primary Examiner* — Orlando Bousono
(74) *Attorney, Agent, or Firm* — LOZA & LOZA, LLP; Richard H. Krukar

(57) ABSTRACT

An electronic door chime can meet safety standards and be compatible with smart doorbells and IOT doorbells. Current generation smart doorbells, also called IOT doorbells, require continuous power to drive the cameras, audio interfaces, and other components within the smart doorbell. Compatibility issues with prior art doorbell systems have emerged with the smart doorbell receiving inadequate power or power that doesn't meet the smart doorbell's input specification. In some cases, a prior art doorbell system is driven to failure or to excessive temperatures when the smart doorbell continuously draws too much power. A new electronic door chime can safely power the smart doorbells while also being compatible with simple push button doorbell devices.

19 Claims, 11 Drawing Sheets

IOT COMPATIBLE ELECTRONIC DOOR CHIME

CROSS REFERENCE TO RELATED APPLICATIONS

This patent application is a continuation in part of U.S. patent application Ser. No. 16/354,763. U.S. patent application Ser. No. 16/354,763 is titled "IOT COMPATIBLE ELECTRONIC DOOR CHIME" and was filed Mar. 15, 2019. U.S. patent application Ser. No. 16/354,763 is herein incorporated by reference in its entirety.

TECHNICAL FIELD

Embodiments are generally related to door chimes, electronic door chimes, consumer electronics, and the network connected devices.

BACKGROUND

Doorbells of a generation or two ago had a transformer, a switch (doorbell), and a sonic transducer (chime, ringer or buzzer). Closing the switch completed the circuit powering the sonic transducer. In the past, doorbells have been upgraded with electronic door chimes. Electronic door chimes can be powered, similar to the mechanical ringers of old, when the switch is closed then the electronic door chime receives power. An advantage of electronic door chimes is that they can generate more and different doorbell sounds and have been cost effective replacements for broken mechanical ringers. More recently, Internet of Things ("IOT") doorbells are gaining popularity.

IOT devices are internet connected sensors and actuators. An IOT doorbell can trigger a message to a person's smart phone or other internet connected device. Some IOT doorbells now include security cameras allowing a person to remotely monitor the happenings outside their door. As many people have discovered, these IOT doorbells are not always compatible with existing doorbells.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is an aspect of the embodiments that an electronic door chime having a housing with a front cover attached to a back cover can meet the safety standards required of consumer electronic devices in the United States ("U.S."). The housing is sized for installation in a two-gang dual voltage junction box. The sizes of junction boxes are often specified by the number of "gangs" which is the number of standard sized wired devices the box can accommodate. As electricians know, junction box sizes have standardized sizes as specified by the National Electric Code ("NEC"). A single gang junction box is approximately 2"×4" with varying depth. A two-gang or dual gang junction box is approximately 4"×4". A dual voltage two-gang junction box has two single-gang sections and a solid wall between the two sections to thereby isolate one section from the other and can thereby form two single gang sections. The solid wall can separate one voltage section from the other voltage section. The back cover has a first compartment and a second compartment with each compartment being sized to fit into a single gang section.

It is another aspect of the embodiments that a power supply inside the first compartment can be attached to the back cover and can produce a power output. The power supply can be a transformer or other device that receives mains electric power and produces a power output that can be an AC (alternating current) output or a DC (direct current) output. In the U.S. mains electric power is typically 120 VAC. For powering external doorbell devices, such as IOT doorbells, the power supply can produce power that is at least 18 VAC and at least 300 mA. Testing has revealed that, with the circuitry herein disclosed, this size power supply can fit in the first compartment, can power an electronic door chime, and can continuously power smart external doorbell devices such as Internet-Of-Things (IOT) doorbells having cameras, processors, and wireless connections. Safety, electronics compatibility, and cost considerations can constrain the power supply to produce no more than 24 VAC and/or no more than 10 VA.

The power output can be passed from the first compartment to a second compartment to power a first circuit in the second compartment. The first circuit can be attached to the back cover within the second compartment. The first circuit has a chiming circuit, a doorbell connector, an inductor circuit, and a monitor circuit. The monitor circuit can be electrically connected in parallel to the inductor circuit. The first circuit is configured to pass a doorbell current through an external doorbell device connected to the doorbell connector. The first circuit can play sounds on a speaker. The speaker can be in the second compartment. The speaker can be held between the first circuit and a front cover by attaching the speaker to the front cover. The doorbell current can be produced by the power supply.

The power output can be provided as output current and output voltage. When the power output is an AC output, the output current is an AC current and the output voltage is an AC voltage. The output current can include the doorbell current and a second doorbell current. In non-limiting exemplary embodiments, the doorbell current also comprises a plurality of currents including an inductor current passing through the inductor circuit and a monitor current passing through the monitor circuit. The monitor circuit produces a trigger sensed signal upon detecting actuation of the external doorbell device. The chiming circuit sends a sound signal to a speaker upon receiving the trigger sensed signal to thereby cause the speaker to produce a sound. When the output current is an AC current, the doorbell current and second doorbell current can be AC currents because they are parts of a larger AC current. Similarly, the inductor current and the monitor current can be AC currents.

The trigger sensed signal can be optically isolated from the doorbell current. In practice, an optoisolator can optically isolate its output from its input and can be considered to have a light emitting diode ("LED") as an input stage and a transistor without a gate wire as an output stage, wherein passing current through the LED illuminates the transistor's gate, thereby driving it from nonconducting to conducting. In this manner the input is optically isolated from the output.

It is a further aspect of the embodiments that a faceplate can be attached to the front cover and configured to cover the electronic door chime when the housing is installed in the dual voltage box.

It is yet another aspect of the embodiments that the electronic door chime and the external doorbell device can be provided together. For example, the external doorbell device and the electronic door chime can be packaged together for delivery to a customer. The external doorbell device can be an IOT doorbell as discussed above or can be a simpler external doorbell device. The first circuit can continuously provide doorbell power to the external doorbell device and the external doorbell device can produce a doorbell trigger signal when a doorbell button is actuated. The doorbell button can be a hardware button or a software button incorporated in a smart external doorbell device. The doorbell current can be fused or current limited, perhaps by a fuse or current limiting resistor.

A simple external doorbell device, can have a rectifier, a switch, and a light emitting diode ("LED"). The doorbell power can be rectified by the rectifier before being used to light the LED. The switch can be a single pole single throw switch that is normally open and that can be closed by pressing the doorbell button. The switch can be the doorbell button. Closing the switch causes the doorbell trigger signal to be communicated to the doorbell sensor. A two-wire bus can carry doorbell power to the external doorbell device and can carry the doorbell trigger signal to the electronic door chime.

The chiming circuit can be a semiconductor chip configured specifically for producing a sound signal as an output upon receiving a signal on an input. Existing semiconductor chips can directly drive a speaker and can cause the speaker to produce one sound when one input is triggered and to produce a different sound when a different input is triggered.

As discussed above, electronic door chimes must be safe. They must be safe to install and they must remain safe after installation. Electronic door chimes must thereby satisfy certain safety requirements. It is for this reason that the power supply, attached to mains electric power, is physically separated from the first circuit that operates at a lesser voltage. The power supply and the first circuit are in separate compartments. Once installed, the power supply and the first circuit can be further isolated by the wall of the dual voltage junction box separating one gang from the other gang. The materials and material thickness forming the front cover and the back cover are also selected to ensure safety.

The back cover and the front cover can be plastic such as Acrylonitrile Butadiene Styrene ("ABS") or Polycarbonate/Acrylonitrile Butadiene Styrene alloy ("PC/ABS"). One nonlimiting embodiment has the back cover and the front cover being ABS and having a minimum thickness of 2.2 mm. A 1.5 mm thickness of the ABS has a UL 94 flame rating of at least V-0, a UL 746 RTI Electric rating of at least 80° C., a UL 746 RTI Impact rating of at least 80° C., and a UL 746 RTI Strength rating of at least 80° C.

Another nonlimiting embodiment has the back cover and the front cover being a PC/ABS and having a minimum thickness of 2.2 mm. A 1.7 mm thickness of the PC/ABS has a UL 94 flame rating of at least V-2, a UL 746 RTI Electric rating of at least 60° C., a UL 746 RTI Impact rating of at least 60° C., and a UL 746 RTI Strength rating of at least 60° C. Note that higher temperatures indicate higher ratings.

It is yet another aspect of the embodiments to have a first circuit further comprising a second doorbell connector, a second inductor circuit and a second monitor circuit connected in parallel with the second inductor circuit. The first circuit can be configured to pass a second doorbell current through a second external doorbell device connected to the second doorbell connector. The second doorbell current can be another AC current within the output current of the power supply. The second doorbell current can be produced by the power supply and can comprise a plurality of second currents comprising a second inductor current passing through the second inductor circuit and a second monitor current passing through the second monitor circuit. The second monitor circuit can produce a second trigger sensed signal upon detecting actuation of the second external doorbell device. As with the trigger sensed signal, the chiming circuit sends the sound signal to the speaker upon receiving the second trigger sensed signal to thereby cause the speaker to produce the sound.

A still yet further aspect of the embodiments is positioning a power supply in a first compartment of a back cover and positioning a first circuit in the second compartment. The back cover can comprise the first compartment and the second compartment and the power supply configured to receive mains electric power and to produce a doorbell current. Forming a housing configured for installation in a dual voltage box can be accomplished by enclosing the first compartment and the second compartment by attaching a front cover to the back cover.

The electronic door chime described here is advantageous because it is compatible with smart external doorbell devices, because it is cost-effective, and because it is safe for installation in existing structures and in new construction. It is through careful engineering and material selection as confirmed by testing that this safe, functional, and cost-effective electronic doorbell chime has been developed.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention. The illustrated examples are nonlimiting and not necessarily to scale.

DETAILED DESCRIPTION

Figure 1:
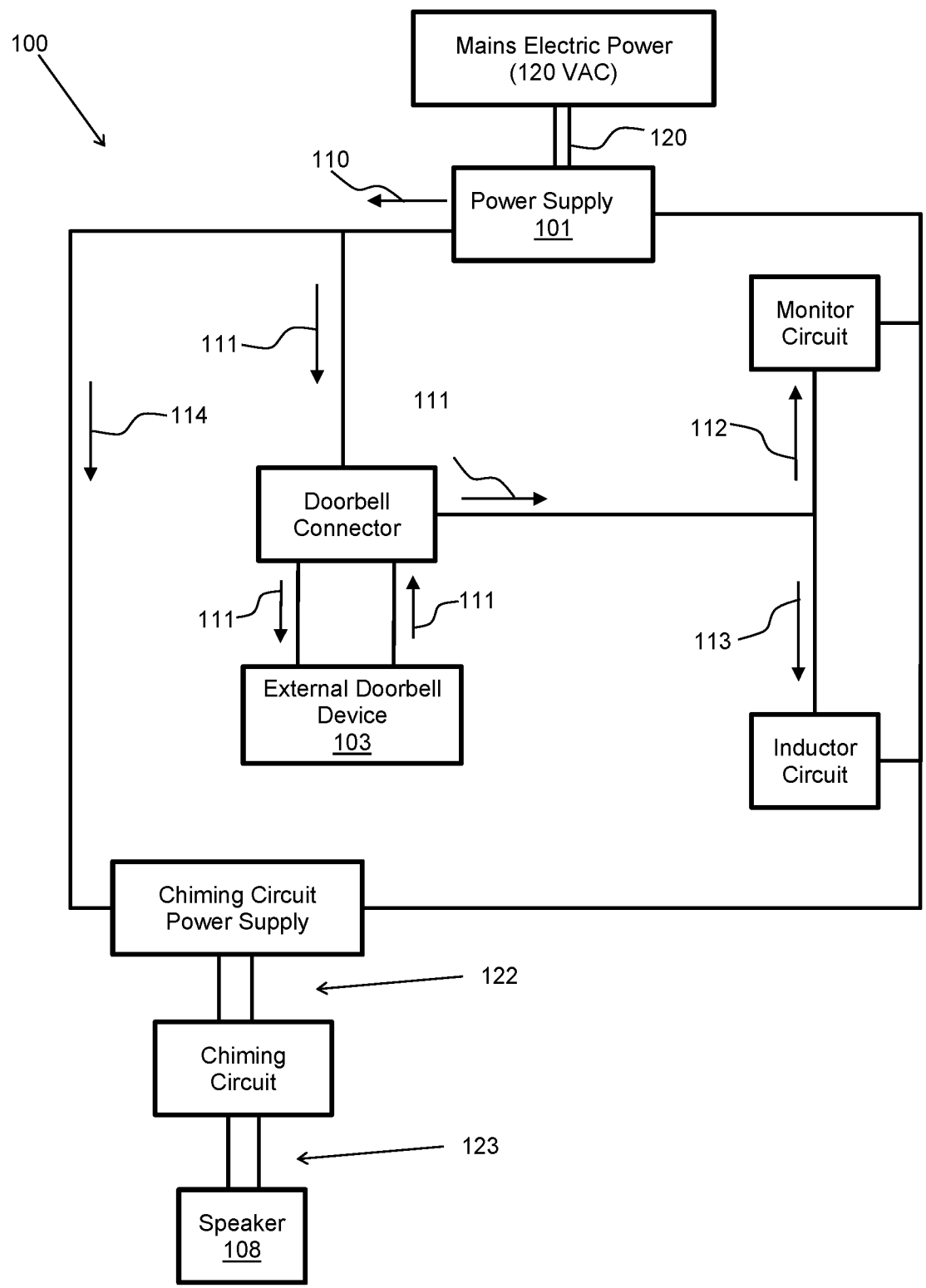
FIG. 1 illustrates electric current flows in an electronic door chime, in accordance with aspects of the embodiments.

The particular values and configurations discussed in these non-limiting examples can be varied and are cited merely to illustrate at least one embodiment and are not intended to limit the scope thereof.

For a general understanding of the present disclosure, reference is made to the drawings. In the drawings, like reference numerals have been used throughout to designate identical elements.

FIG. 1 illustrates electric current flows in an electronic door chime 100, in accordance with aspects of the embodiments. The power supply 101 is connected by mains power lines 120 connected to mains power 121. The power supply 101 is configured for supplying electric power to the electronic door chime. The electric power is provided by an output current 110 at an output voltage. The power supply 101 can be a transformer producing an AC output that is at least 18 VAC and at least 300 mA. For safety and for certification as a safe device, the power supply can be configured to produce an AC output that is no more than 24 VAC and/or to produce no more than 10 VA.

In compliance with Kirchhoff's current law which states that the amount of current entering a node equals the amount of current leaving a node, the output current 110 can include a plurality of currents that, in sum, equal the output current. The output current 110 can include a doorbell current 111 and a chiming current 114. The doorbell current 111 can pass through a doorbell connector 102, to an external doorbell device 103, and back to the doorbell connector 102. The doorbell current 111 can include an inductor current 113 and a monitor current 112. The inductor current 113 can pass through an inductor circuit 104. The monitor current 112 can pass through a monitor circuit 105. The chiming current 114 can pass through a chiming circuit power supply 106 that provides chiming circuit power 122 that powers a chiming circuit 107. The chiming circuit 107 can send a sound signal 123 to a speaker 108 that produces a sound. The speaker 108 can be a transducer that converts the sound signal 123, which is an electric signal, into a sound.

Figure 2:
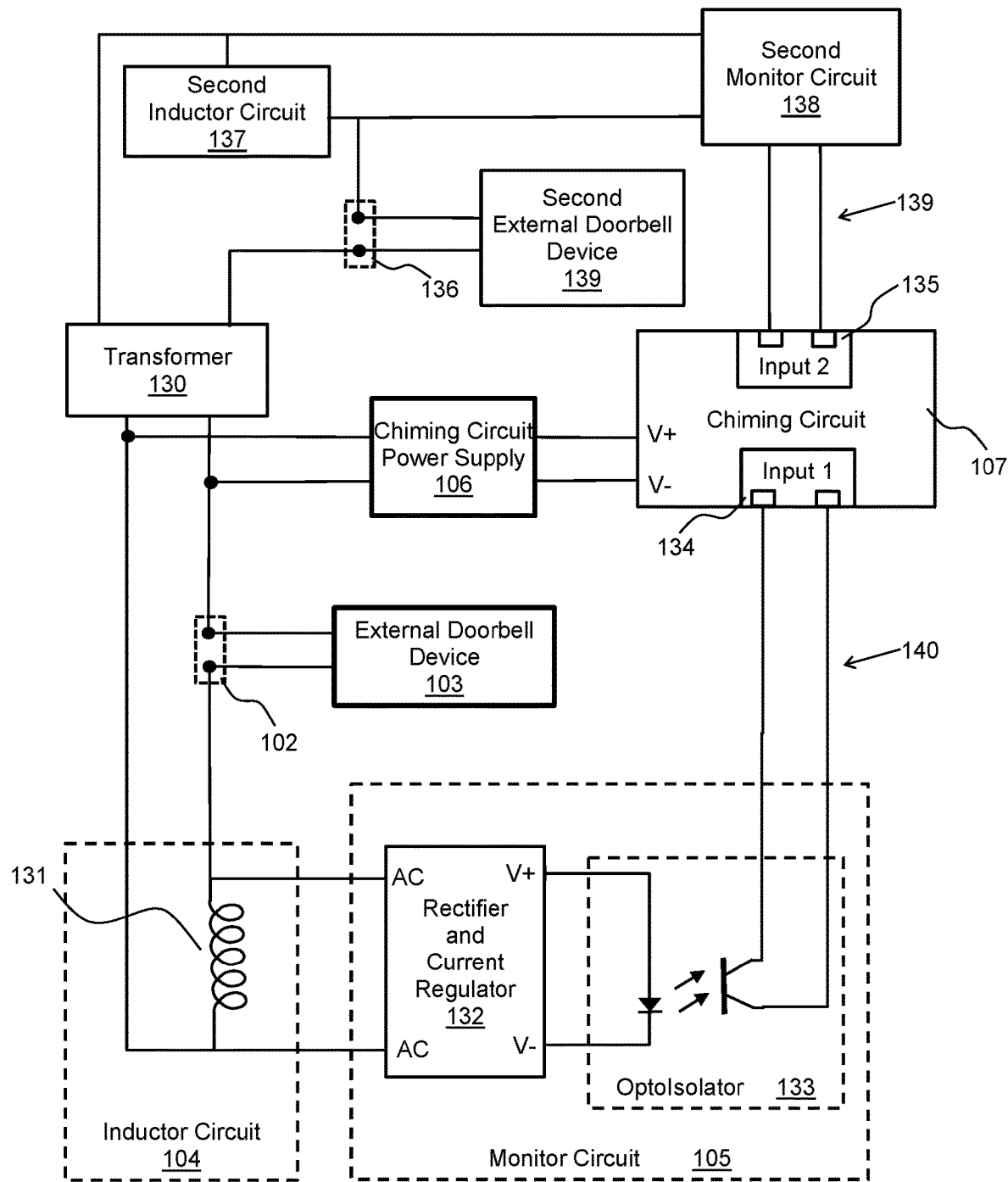
FIG. 2 illustrates a high-level block diagram of an electronic door chime, in accordance with aspects of the embodiments.

FIG. 2 illustrates a high-level block diagram of an electronic door chime, in accordance with aspects of the embodiments. The electronic door chime of FIG. 2 uses a transformer 130 that can provide electric power to the chiming power supply 106. The transformer 130 can produce a doorbell current and a second doorbell current. The doorbell current can include an inductor current that passes through inductor circuit 104 and a monitor current that passes through monitor circuit 105. The monitor circuit 105 can produce a trigger sensed signal 140. The trigger sensed signal 140 can be received by the chiming circuit 107 at a first trigger input 134. The second doorbell current can include a second inductor current that passes through second inductor circuit 137 and a second monitor current that passes through second monitor circuit 138. The second monitor circuit 138 can produce a second trigger sensed signal 139. The second trigger sensed signal 139 can be received by the chiming circuit 107 at a second trigger input 135.

The inductor circuit 104 is illustrated as including an inductor 131. The inductor circuit 104 can contain other circuit elements. The monitor circuit 105 is illustrated as containing a rectifier and current regulator 132 and an optoisolator 133. The monitor circuit 105 can contain additional circuit elements. As discussed above, a doorbell current passes though the external doorbell device 103 and can power an IOT doorbell or another device. Activation of the doorbell of the external doorbell device 103 can cause a change in the doorbell current, thereby causing a change in the amount of current passing through rectifier 132 which is electrically parallel to the inductor 131. The rectifier 132 can turn the optoisolator input stage on or off by providing current or not providing current, respectively. The optoisolator output stage can thereby produce the trigger sensed signal. For example, when the doorbell of the external doorbell device 103 is not activated then substantially all of the doorbell current can pass through the inductor circuit 104. Activating the doorbell can result in the rectifier becoming powered and thereby providing a current to the optoisolator input stage. The optoisolator input current can cause the optoisolator output stage to transition to a conducting state which is detected by the chiming circuit 107 as the trigger sensed signal 140.

Figure 3:
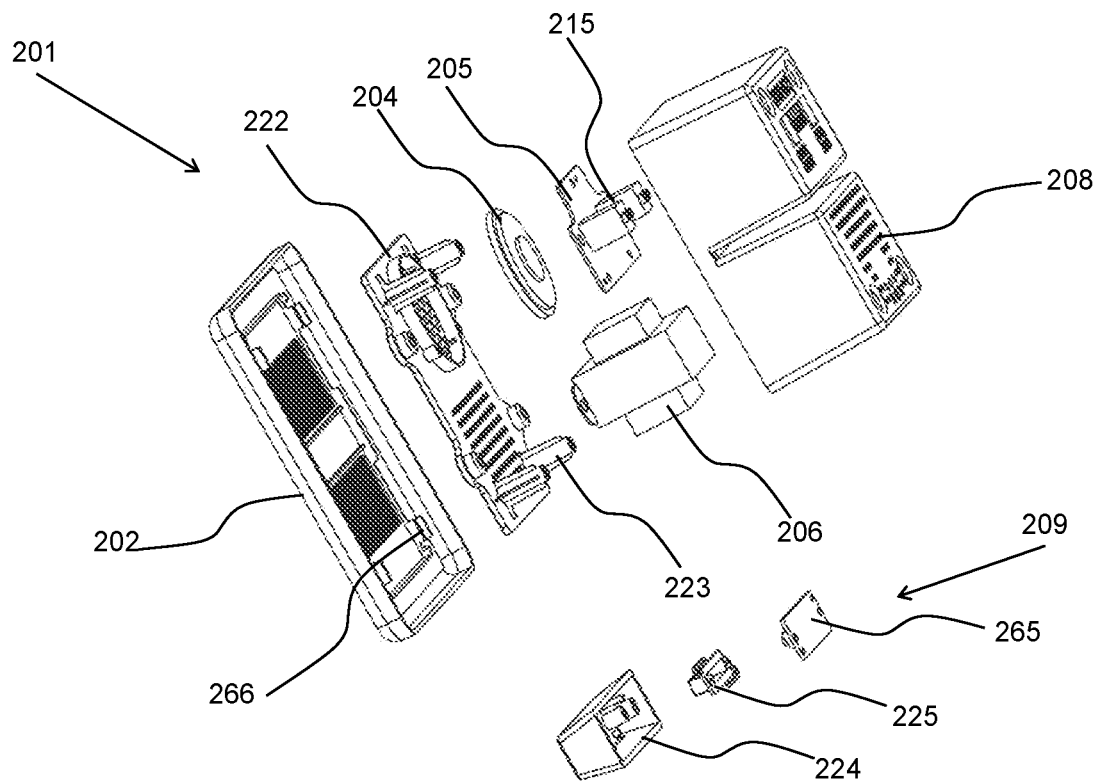
FIG. 3 is an exploded view of an electronic door chime in accordance with aspects of the embodiments.
Figure 4:
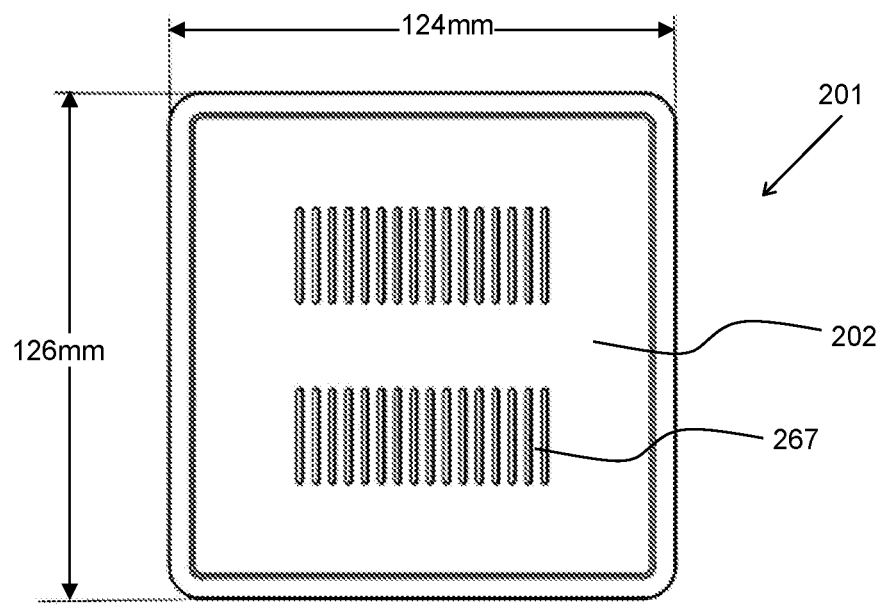
FIG. 4 is a top view of an electronic door chime in accordance with aspects of the embodiments.
Figure 5:
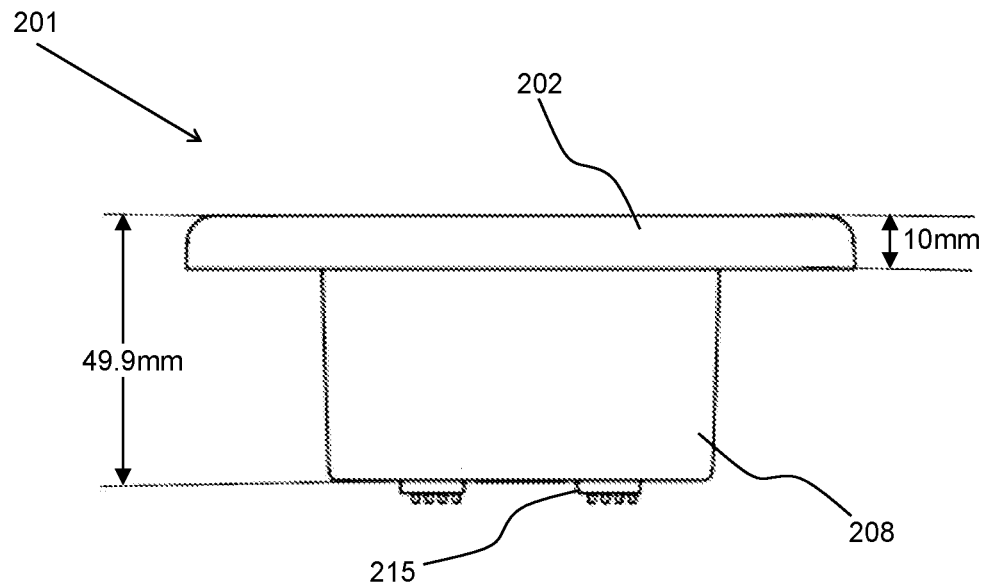
FIG. 5 is a side view of an electronic door chime in accordance with aspects of the embodiments.
Figure 6:
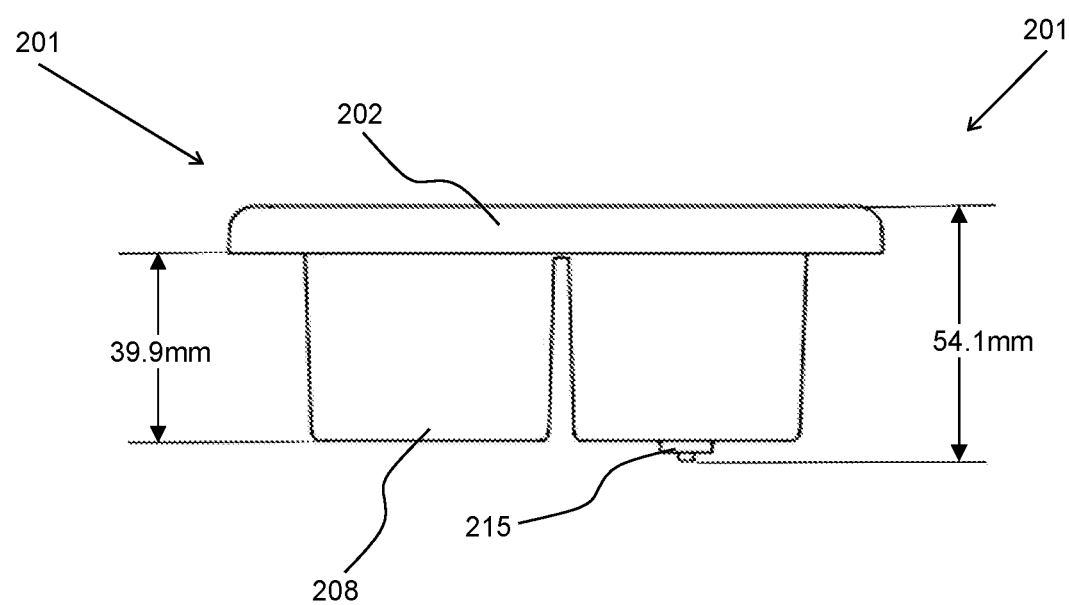
FIG. 6 is another side view of an electronic door chime in accordance with aspects of the embodiments.

FIG. 3 illustrates an exploded view of an electronic door chime 201 in accordance with aspects of the embodiments. FIGS. 4-6 also provide views of the electronic door chime of FIG. 3. The back cover 208 has two compartments, a first compartment 227 and a second compartment 228. A transformer 206 is installed in the first compartment 227. Screws can attach the transformer 206 to transformer standoffs 233 molded into the back cover 208. A first circuit 205 is installed in the second compartment 228. Screws can attach the first circuit 205 to circuit standoffs 234 molded into the back cover 208. A speaker 204 can be attached to a speaker mount 231 molded into the front cover 222. Screws can attach the speaker to speaker mounting holes 280. The front cover 222 can be attached to the back cover 208, covering the first compartment 227 and the second compartment 228. Front cover standoffs 223 can be molded into the front cover 222. Back cover standoffs 232 can molded into the back cover 208. Screws in the back cover standoffs 232 can pull the front cover standoffs 223 against the back cover standoffs 232, thereby attaching the front cover 222 to the back cover 208. The first circuit's 205 doorbell connectors or doorbell interfaces 215 can extend out of windows in the back cover 208 when the first circuit 205 is installed. External doorbell devices can be electrically attached or connected to the first circuit by the doorbell interfaces 215.

An external doorbell device 209 has a doorbell cover 224, a button 225, and a doorbell circuit 265. The electronic door chime 201 has been designed for use with smart external doorbell devices. The external doorbell device 209 is a simple device that is also compatible with the electronic door chime 201.

FIG. 4 is a top view of the electronic door chime 201 of FIGS. 3-6 in accordance with aspects of the embodiments. The faceplate 202 can be seen to be sized to cover a two-gang junction box. The faceplate 202 removably attaches to the front cover 222 by clips 266 that can be seen in FIG. 3. The faceplate 202 has slots 267 allowing airflow into and through the electronic door chime 201. For safety the two-gang dual voltage box should be a UL certified two-gang dual voltage box.

FIGS. 5 and 6 are side views of the electronic door chime 201 of FIGS. 3-6 in accordance with aspects of the embodiments. The faceplate 202 is installed and the back cover 208 can be seen. A doorbell interface 215 can be seen extending through windows in the back cover 208. The 39.9 mm depth, or total depth of 44.1 mm which includes the doorbell interfaces 215, provides for installing the electronic door chime into a dual voltage junction box. A dual voltage junction box can have a closed section that is closed on five sides and has a depth larger than 45 mm. As such, a total depth less than 44.9 mm provides for installing the electronic door chime into a dual voltage junction box. The first compartment 227 can be positioned in the closed section.

Figure 7:
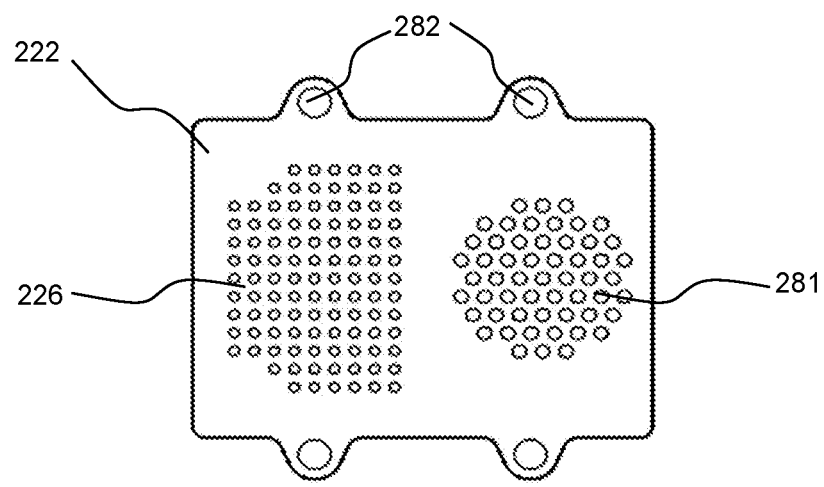
FIG. 7 illustrates the front side of a front cover of an electronic door chime in accordance with aspects of the embodiments.
Figure 8:
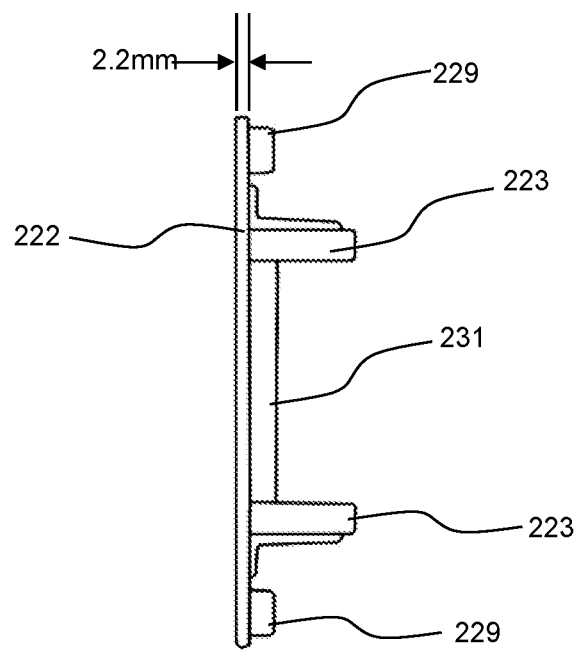
FIG. 8 illustrates a side view of a front cover of an electronic door chime in accordance with aspects of the embodiments.
Figure 9:
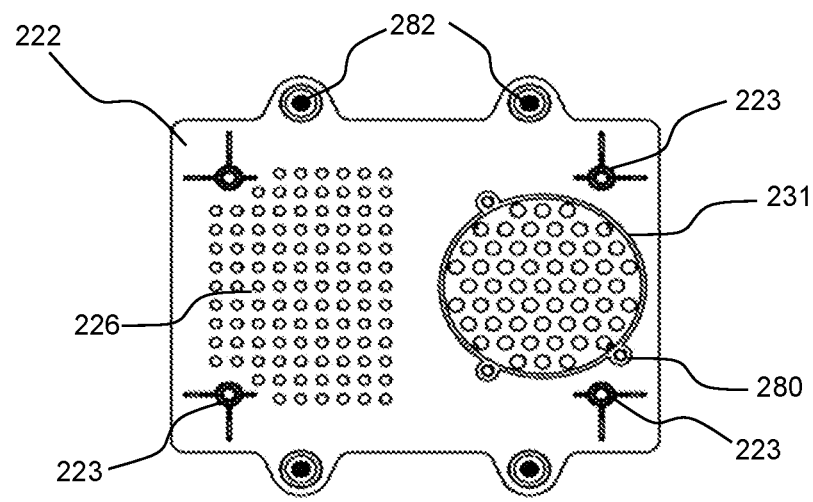
FIG. 9 illustrates the back side of a front cover of an electronic door chime in accordance with aspects of the embodiments.
Figure 10:
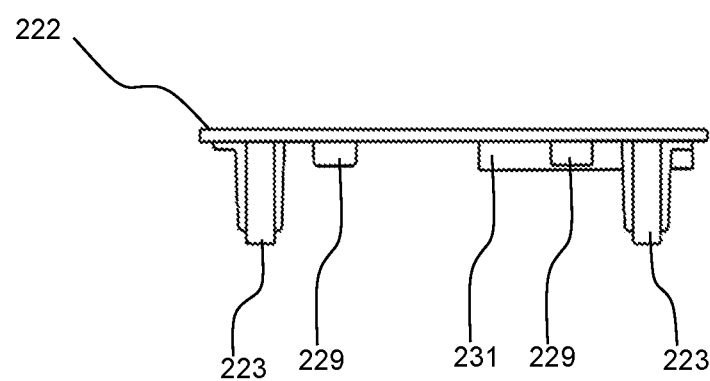
FIG. 10 illustrates another side view of a front cover of an electronic door chime in accordance with aspects of the embodiments.

FIGS. 7-10 illustrate views of the front cover 222 of the electronic door chime 201 of FIGS. 3-6, in accordance with aspects of the embodiments. FIG. 7 illustrates the front side of the front cover 222. FIG. 8 illustrates a side view of the front cover 222. FIG. 9 illustrates the back side of the front cover 222. FIG. 10 illustrates another side view of the front cover 222. Air holes 226 provide paths for air to circulate to the power supply 206. Sound holes 281 are positioned to be in front of the speaker 204. The electronic door chime 201 can be attached to a dual voltage junction box by screws passing through mounting holes 282. The mounting holes 282 pass through junction box spacers 229 molded into the front cover 222. The side of the speaker mount 231 can be seen in FIGS. 8 and 10. The front cover standoffs 223 are also molded into the front cover 222. The front cover is illustrated as 2.2 mm thick because testing has revealed that electronic door chimes can be certified as safe when the front cover is 2.2 mm thick and formed from ABS or PC/ABS having properties as discussed above.

Figure 11:
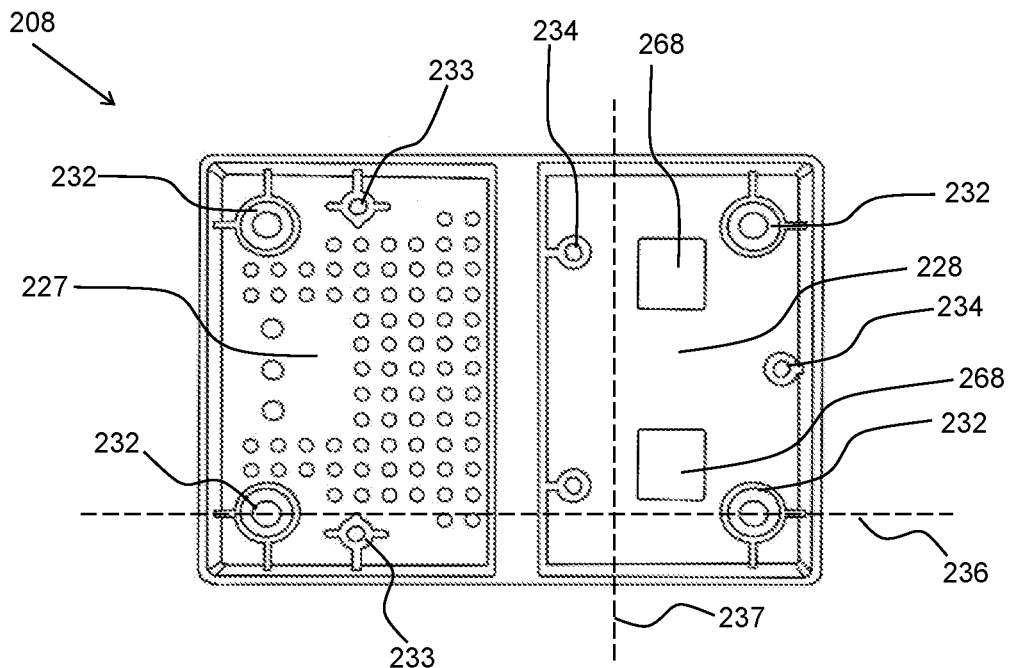
FIG. 11 illustrates a back cover of an electronic door chime viewed from the front in accordance with aspects of the embodiments.
Figure 12:
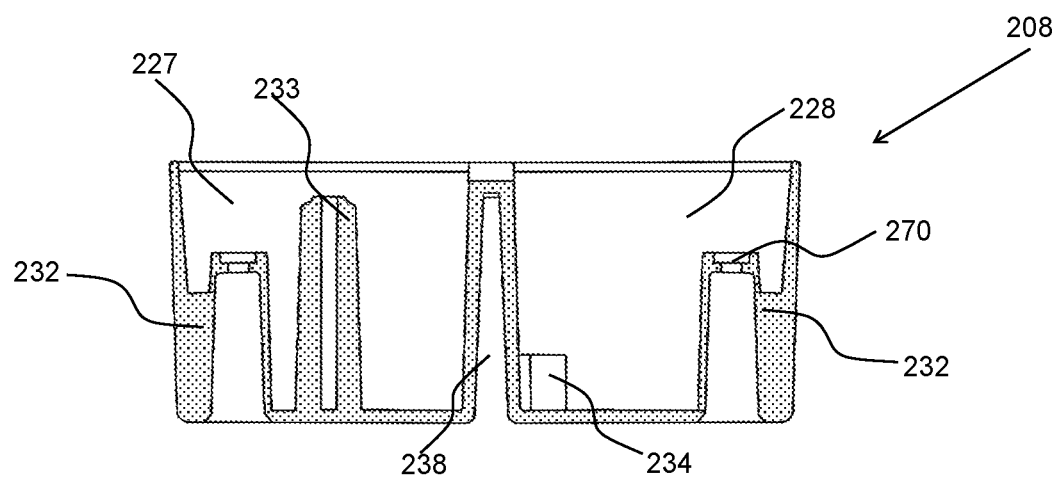
FIG. 12 illustrates a cut view of a back cover of an electronic door chime in accordance with aspects of the embodiments.
Figure 13:
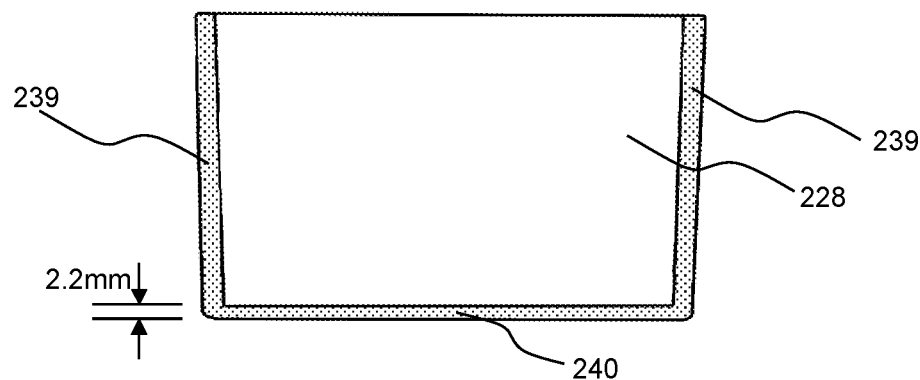
FIG. 13 illustrates another cut view of a back cover of an electronic door chime in accordance with aspects of the embodiments.
Figure 14:
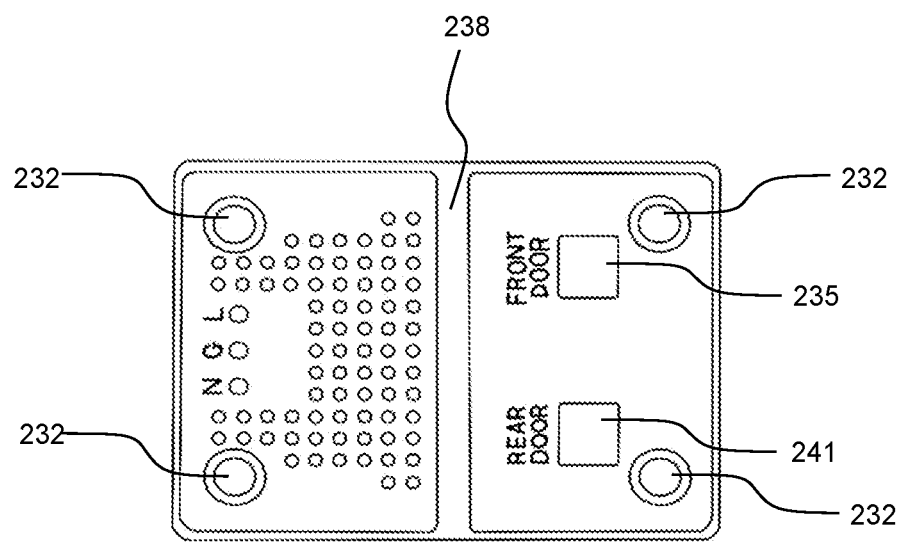
FIG. 14 illustrates a back cover of an electronic door chime viewed from the rear in accordance with aspects of the embodiments.

FIGS. 11-14 illustrate views of the back cover 208 of the electronic door chime 201 of FIGS. 3-6 in accordance with aspects of the embodiments. FIG. 11 illustrates the back cover 208 viewed from the front such that the insides of the first compartment 227 and the second compartment 228 are visible. FIG. 12 illustrates a cut view of the back cover 208 along cut line 236 seen in FIG. 11. FIG. 13 illustrates another cut view of the back cover 208 along cut line 237 seen in FIG. 11. FIG. 14 illustrates the back cover 208 viewed from the rear.

Back cover standoffs 232 can be seen molded into the first compartment 227 and second compartment 228. The first compartment, in this embodiment configured for transformer 206, has molded in transformer standoffs 233 and numerous air holes. The second compartment 228, in this embodiment configured for the first circuit 205, has molded-in circuit standoffs 234 and windows 268 through which doorbell interfaces 215 can extend. The back wall 240 and sidewalls 239 of the back cover 208 are shown to be 2.2 mm thick. As with the front cover 222, a thickness of 2.2 mm has been confirmed through testing to provide a safe electronic door chime when formed of the ABS or PC/ABS materials discussed above. The ends of the front cover standoffs 223 can fit into indents 270 in the back cover standoffs 232 to help with alignment during assembly and to strengthen to connection between the front cover standoffs 223 and the back cover standoffs 232.

Figure 15:
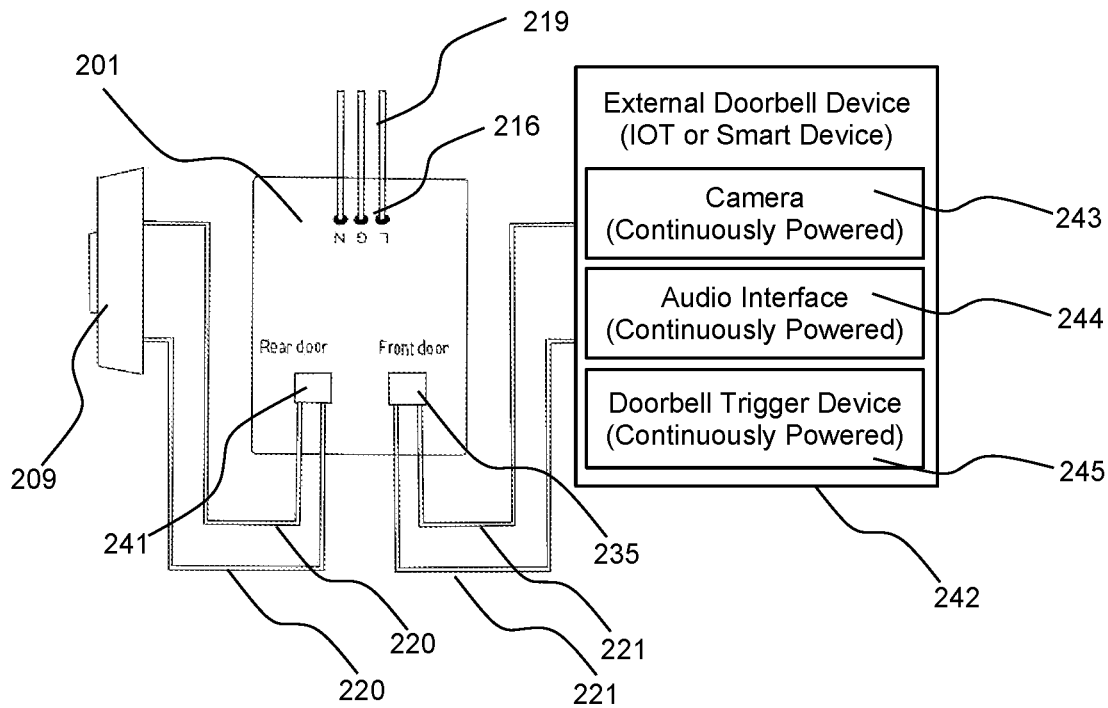
FIG. 15 illustrates an electronic door chime connected to a simple external doorbell device and to a smart external doorbell device in accordance with aspects of the embodiments.

FIG. 15 illustrates an electronic door chime 201 connected to a simple external doorbell device 209 and to a smart external doorbell device 242 or IOT enabled external doorbell device 242 in accordance with aspects of the embodiments. A first two-wire bus 221 connects a first doorbell interface 235 to a smart external doorbell device 242. The nonlimiting smart external doorbell device 242 has a camera 243, audio interface 244 and doorbell trigger device 245. Here, the camera 243, audio interface 244 and doorbell trigger device 245 are all continuously powered by the electronic door chime 201. The doorbell trigger device 245 can therefore be a capacitive sensor, a software implemented button on a graphical user interface, etc. Smart external doorbell devices, particularly IOT doorbells, commonly have wireless communications interfaces for connection to the internet.

A simple external doorbell device 209 is connected by a second two-wire bus 220 to a second doorbell interface 241. The electronic door chime 201 is powered by mains electric power 219 (e.g. 120 VAC) arriving at a mains power interface 216.

Figure 16:
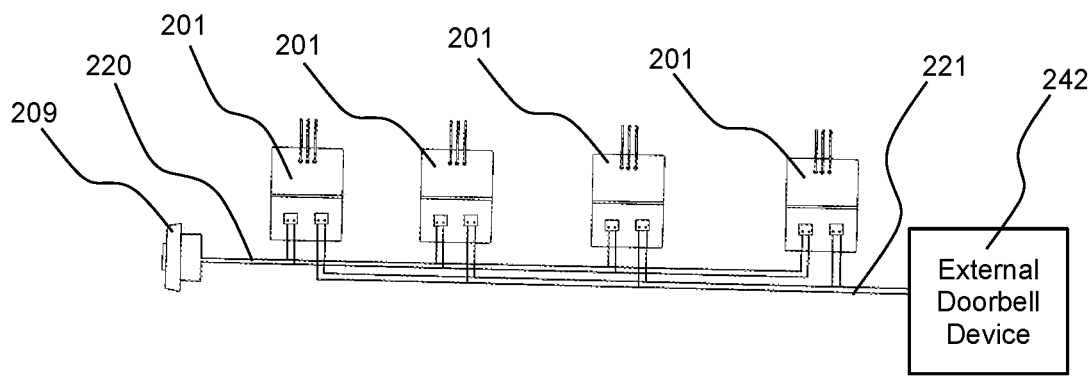
FIG. 16 illustrates multiple electronic door chimes connected to external doorbell devices by two-wire busses in accordance with aspects of the embodiments.

FIG. 16 illustrates multiple electronic door chimes 201 connected to external doorbell devices 209, 242 by two-wire busses 220, 221 in accordance with aspects of the embodiments. The multiple electronic chimes 201, including a first electronic door chime 201, a second electronic door chime 201, a third electronic door chime 201, and a fourth electronic door chime 201, can all be identical. The two-wire buses carry doorbell power and doorbell trigger signals. As such, each two-wire bus provides direct electrical connection between multiple doorbell interfaces and an external doorbell device. A first two-wire bus 221 connects a smart external doorbell device 242 to four electronic door chimes 201. A second two-wire bus 220 connects a simple external doorbell device 209 to four electronic door chimes 201.

Figure 17:
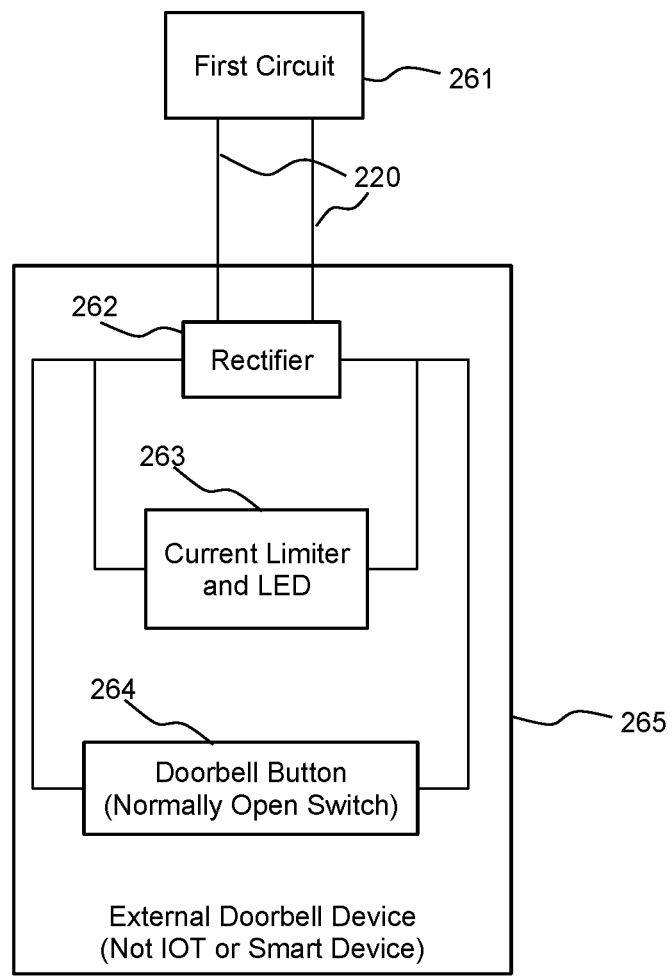
FIG. 17 illustrates an external doorbell device that is compatible with an electronic door chime in accordance with aspects of the embodiments.

FIG. 17 illustrates an external doorbell device 265 that is compatible with an electronic door chime 201 in accordance with aspects of the embodiments. The first circuit 261 can be connected to the external doorbell device 265 by a two-wire bus 220. The two-wire bus can carry doorbell power. For compatibility with certain IOT doorbells, the doorbell power should be no less than 18 VAC, no greater than 24 VAC, and at the same frequency as mains electric power, likely 60 Hz. Doorbell power is rectified by rectifier 262 and, when switch 264 is open, passes through current limiter and LED 263. The LED lights up, providing an illuminated doorbell. When doorbell button 264 is pressed, closing the switch, current may stop flowing through the LED because the current instead flows through the switch. As such, the LED is configured to light only when the switch is open.

Figure 18:
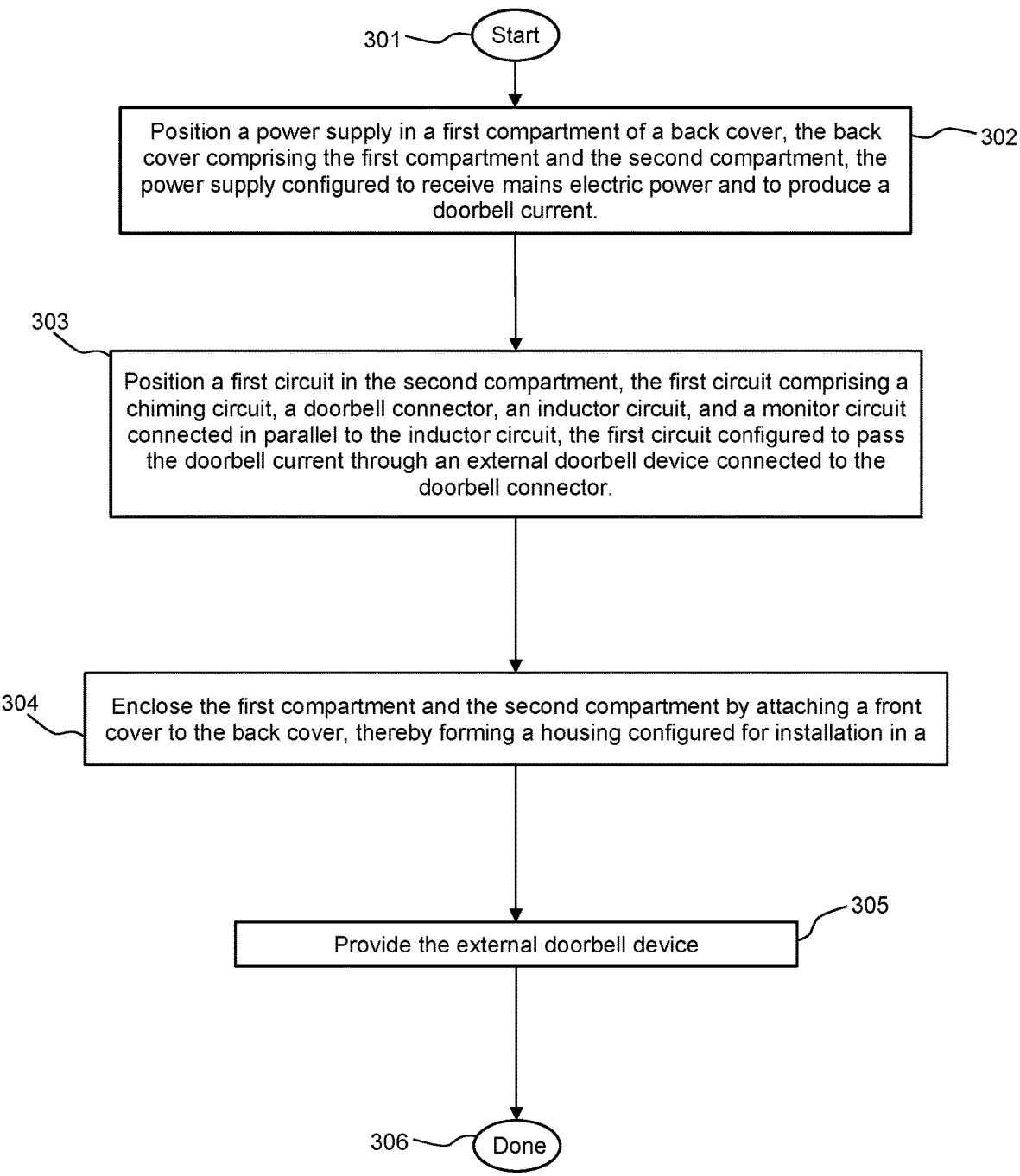
FIG. 18 illustrates a high-level flow diagram of assembling and using an electronic door chime in accordance with aspects of the embodiments.

FIG. 18 illustrates a high-level flow diagram of assembling and providing an electronic door chime in accordance with aspects of the embodiments. After the start 301, a power supply is positioned in a first compartment of a back cover, the back cover comprising the first compartment and the second compartment, the power supply configured to receive mains electric power and to produce a doorbell current 302. A first circuit can be positioned in the second compartment, the first circuit comprising a chiming circuit, a doorbell connector, an inductor circuit, and a monitor circuit connected in parallel to the inductor circuit, the first circuit configured to pass the doorbell current through an external doorbell device connected to the doorbell connector 303. Other components such as the speaker can be installed.

The first compartment and the second compartment can be enclosed by attaching a front cover to the back cover, thereby forming a housing configured for installation in a dual voltage box 304. The housing houses components such as the power supply and first circuit. A faceplate can be attached to the housing. The electronic door chime can be packaged and provided to a customer, user, or other recipient. Alternatively, the electronic door chime can be packaged with an external doorbell device 305 and provided to a customer, user, or other recipient. The electronic door chime having been assembled and provided to a customer, user, or other recipient, the method is done 306.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. An electronic door chime comprising:
   a back cover comprising a first compartment and a second compartment;
   a front cover attached to the back cover to thereby form a housing that is configured to be installed in a dual voltage box;
   a power supply in the first compartment configured to receive mains electric power and to produce a doorbell current; and
   a first circuit that is in the second compartment and that includes a chiming circuit, a doorbell connector, an inductor, and a monitor circuit;
   wherein the monitor circuit is connected in parallel to the inductor;
   wherein the doorbell current includes an inductor current that passes through the inductor and a monitor current that passes through the monitor circuit;
   wherein the inductor current passes into the doorbell connector, then through an external doorbell device, then back through the doorbell connector to thereby power the external doorbell device when the external doorbell device is connected to the doorbell connector;
   wherein the monitor circuit produces a trigger sensed signal upon detecting actuation of the external doorbell device; and
   wherein the chiming circuit sends a sound signal to a speaker upon receiving the trigger sensed signal to thereby cause the speaker to produce a sound.

2. The electronic door chime of claim 1 wherein the power supply is a transformer producing an AC output that is at least 18 VAC and at least 300 mA.

3. The electronic door chime of claim 1 wherein the power supply produces an AC output that is no more than 24 VAC, and wherein the AC output is no more than 10 VA.

4. The electronic door chime of claim 1 wherein the dual voltage box is a two-gang dual voltage junction box.

5. The electronic door chime of claim 1 wherein the doorbell current is an AC current produced by the power supply.

6. The electronic door chime of claim 1 wherein the trigger sensed signal is optically isolated from the doorbell current.

7. The electronic door chime of claim 1 further comprising a faceplate attached to the front cover and configured to cover the electronic door chime when the housing is installed in the dual voltage box.

8. The electronic door chime of claim 1 further comprising the external doorbell device, the external doorbell device comprising a rectifier, a switch, and a light emitting diode configured to light only when the switch is open.

9. The electronic door chime of claim 1 wherein the back cover and the front cover are plastic and have a minimum thickness of 2.2 mm.

10. The electronic door chime of claim 1, the first circuit further comprising
    a second doorbell connector, a second inductor circuit and a second monitor circuit connected in parallel with the second inductor circuit, the first circuit configured to pass a second doorbell current through a second external doorbell device connected to the second doorbell connector;
    wherein the second doorbell current is produced by the power supply and comprises a plurality of second currents comprising a second inductor current passing through the second inductor circuit and a second monitor current passing through the second monitor circuit;
    wherein the second monitor circuit produces a second trigger sensed signal upon detecting actuation of the second external doorbell device; and
    wherein the chiming circuit sends the sound signal to the speaker upon receiving the second trigger sensed signal to thereby cause the speaker to produce the sound.

11. The electronic door chime of claim 10 further comprising:
    a faceplate attached to the front cover and configured to cover the electronic door chime when the housing is installed in the dual voltage box;
    the external doorbell device, the external doorbell device comprising a rectifier, a switch, and a light emitting diode configured to light only when the switch is open; and
    the second external doorbell device;
    wherein the power supply is a transformer producing an AC output that is at least 18 VAC and at least 300 mA;
    wherein the AC output is no more than 24 VAC and is no more than 10 VA;
    wherein the dual voltage box is a two-gang dual voltage junction box;
    wherein the back cover and the front cover are plastic and have a minimum thickness of 2.2 mm;
    wherein the doorbell current is an AC current produced by the power supply;
    wherein the second doorbell current is another AC current produced by the power supply;
    wherein the trigger sensed signal is optically isolated from the doorbell current; and
    wherein the second trigger sensed signal is optically isolated from the second doorbell current.

12. A method comprising:
    positioning a power supply in a first compartment of a back cover, the back cover comprising the first compartment and a second compartment, the power supply configured to receive mains electric power and to produce a doorbell current; and
    positioning a first circuit in the second compartment, the first circuit comprising a chiming circuit, a doorbell connector, an inductor, and a monitor circuit; and
    enclosing the first compartment and the second compartment by attaching a front cover to the back cover, thereby forming a housing that is configured to be installed in a dual voltage box;
    wherein the monitor circuit is connected in parallel to the inductor;

wherein the doorbell current includes an inductor current that passes through the inductor and a monitor current that passes through the monitor circuit;

wherein the inductor current passes into the doorbell connector, then through an external doorbell device, then back through the doorbell connector when the external doorbell device is connected to the doorbell connector;

wherein the monitor circuit produces a trigger sensed signal upon detecting actuation of the external doorbell device; and wherein the chiming circuit sends a sound signal to a speaker upon receiving the trigger sensed signal to thereby cause the speaker to produce a sound.

13. The method of claim 12 further comprising providing the external doorbell device.

14. The method of claim 13 wherein the external doorbell device comprises a rectifier, a switch, and a light emitting diode configured to light only when the switch is open.

15. The method of claim 12 wherein the power supply is a transformer producing an AC output, and wherein the AC output is at least 18 VAC and at least 300 mA.

16. The method of claim 12 wherein the power supply produces an AC output that is no more than 24 VAC and wherein the AC output is no more than 10 VA.

17. The method of claim 12 wherein the dual voltage box is a two-gang dual voltage junction box.

18. The electronic door chime of claim 1, wherein the monitor circuit includes a rectifier that is electrically parallel to the inductor.

19. The electronic door chime of claim 18, wherein activation of a doorbell of the external doorbell device results in the rectifier becoming powered and thereby providing a current to an optoisolator input stage of an optoisolator.

* * * * *